United States Patent
Murahashi et al.

(10) Patent No.: US 7,999,954 B2
(45) Date of Patent: Aug. 16, 2011

(54) METHODS AND DEVICES FOR HOST ERROR DETECTION BY A PRINTER

(75) Inventors: Kenichi Murahashi, Matsumoto (JP); Yukiharu Horiuchi, Chino (JP); Yuji Yoshida, Matsumoto (JP)

(73) Assignee: Seiko Epson Corporation, Toyko (JP)

( * ) Notice: Subject to any disclaimer, the term of this patent is extended or adjusted under 35 U.S.C. 154(b) by 1197 days.

(21) Appl. No.: 11/657,423

(22) Filed: Jan. 23, 2007

(65) Prior Publication Data

US 2007/0171457 A1 Jul. 26, 2007

(30) Foreign Application Priority Data

Jan. 26, 2006 (JP) .................................. 2006-018243

(51) Int. Cl.
*G06K 15/00* (2006.01)

(52) U.S. Cl. ...... 358/1.14; 358/1.15; 358/1.9; 358/1.13; 714/44; 714/51; 714/55

(58) Field of Classification Search .................. 358/1.14, 358/1.15, 1.13, 1.16, 1.9; 714/44, 51, 55
See application file for complete search history.

(56) References Cited

U.S. PATENT DOCUMENTS

| | | | |
|---|---|---|---|
| 5,437,004 A | | 7/1995 | Miyasaka et al. |
| 5,692,110 A | | 11/1997 | Miyasaka et al. |
| 5,748,884 A | * | 5/1998 | Royce et al. ........... 714/57 |
| 5,915,078 A | | 6/1999 | Miyasaka et al. |
| 6,006,662 A | * | 12/1999 | Ishida et al. ............ 101/141 |
| 6,104,496 A | | 8/2000 | Minowa et al. |
| 6,184,995 B1 | * | 2/2001 | Sakai et al. ............ 358/1.15 |
| 6,212,558 B1 | * | 4/2001 | Antur et al. ............ 709/221 |
| 6,252,673 B1 | | 6/2001 | Miyasaka et al. |
| 6,268,928 B1 | * | 7/2001 | Ogino .................. 358/1.15 |
| 6,622,266 B1 | * | 9/2003 | Goddard et al. ............ 714/44 |
| 6,646,755 B1 | * | 11/2003 | Iwai et al. .............. 358/1.14 |
| 6,826,706 B2 | * | 11/2004 | Hanna .................. 713/502 |
| 6,910,817 B2 | * | 6/2005 | Fukano .................. 400/76 |
| 6,981,048 B1 | * | 12/2005 | Abdolbaghian et al. ...... 709/228 |
| 7,503,712 B2 | * | 3/2009 | Fukano .................. 400/76 |
| 7,675,638 B2 | * | 3/2010 | Czyszczewski et al. ..... 358/1.14 |

(Continued)

FOREIGN PATENT DOCUMENTS

EP 0631225 12/1994

(Continued)

OTHER PUBLICATIONS

European Search Report for the corresponding European application No. 06026830.7-1248 filed May 30, 2008.

*Primary Examiner* — Twyler Haskins
*Assistant Examiner* — Dennis Dicker
(74) *Attorney, Agent, or Firm* — Nutter McClennen & Fish LLP; John J. Penny, Jr.; Michael P. Visconti, III

(57) ABSTRACT

A printer comprising a reception unit for receiving a command or data sent from a host computer, a timer for counting elapsed time after the command or data is received, and an error detection unit for reporting that the host computer is in an error state when the command or data from the host computer is not received within a predetermined time after the timer starts counting the elapsed time.

17 Claims, 6 Drawing Sheets

U.S. PATENT DOCUMENTS

2002/0097423 A1* 7/2002 Qiao ............................ 358/1.14
2003/0112452 A1* 6/2003 McIntyre ........................ 358/1.1

FOREIGN PATENT DOCUMENTS

| JP | 04-186944 A | 7/1992 |
| JP | 08-337015 | 12/1996 |
| JP | 10-181159 A | 7/1998 |
| JP | 11175303 | 7/1999 |
| JP | 2001071591 | 3/2001 |
| JP | 2003-300368 A | 10/2003 |

* cited by examiner

METHODS AND DEVICES FOR HOST ERROR DETECTION BY A PRINTER

The present application claims priority to Japanese Patent Application No. JP 2006-018243 filed on Jan. 26, 2006, which is hereby incorporated by reference in its entirety.

BACKGROUND OF THE INVENTION

1. Technical Field

The present invention relates to a printer that is communicably connected over a network to a host computer and operates according to commands and data sent from the host computer, to a host computer, to a printing system, and to a control method for the printing system.

2. Related Art

On-line systems that are communicably connected over a network to a host computer are known. In such on-line systems data is typically exchanged between a host computer and a terminal device that is located remotely from the host computer. In response to requests from the remotely located terminal devices, such as automatic teller machines (ATM) in bank branches, cash dispensers, and POS terminals in retail stores, for example, the host computer executes a particular transaction process using the data passed from the terminal device and returns the result of the process to the terminal device, and the terminal device then outputs the result of the transaction process.

Japanese Unexamined Patent Appl. Pub. JP-A-2005-222310 teaches a POS system 1 including a POS terminal computer 60, a printer 10, and a POS server 70. The POS terminal computer 60 computes the total of a sales transaction based on product information input by an operator. The printer 10 is connected to the POS terminal computer 60 and executes processes related to printing sales receipts R and reward cards P that record reward points awarded for product purchases, for example. The POS server 70 is connected to the POS terminal computer 60 over a network 75. This POS system 1 provides a reward points system as part of customer services designed to stimulate customer desire to buy more products and to secure repeat business from a regular customer base by recording points earned according to the total purchase amount or number of purchases, for example, on a reward card or membership card carried by the customer, and then provides certain benefits to the customer when the accumulated number of points reaches a particular level.

In a POS system 1 such as this, the plural POS terminal computers 60 and printers 10 are each managed by the same operator. In other types of on-line systems, however, the printer 10 is not managed by a local terminal device as it is in a POS system, and the printer 10 is instead directly controlled by a server (host computer) located in a remote location. If the operator is located near the printer and not the server in such a system, the operator cannot determine if the server is operating normally when the system is being used.

An example of a such an arrangement is when a subsystem other than the POS system 1 is also deployed in a store, and a printer other than the POS terminal printer 10 is used at the operator location. In this arrangement the subsystem server instructs the subsystem printer to print a ticket or coupon, for example, in conjunction with an operation of the POS system 1 operation, and the subsystem printer prints the tickets or coupons only when so instructed by the subsystem server. In this example the operator does not know when a ticket or coupon will be issued by the subsystem printer. Therefore, if the entire server or an application that runs on the subsystem server crashes or hangs, or a communication error occurs in the connection between the server and printer, the operator has no way of immediately knowing that there is a problem with the server or connection. As a result, the ticket or coupon will not be issued as required at the appropriate timing and the operator will proceed with the transaction while remaining unaware that a problem has occurred.

SUMMARY

The present invention provides a printer that operates according to commands and data sent from a host computer and can know immediately when there is a problem with the host computer when the host computer is in a remote location, a host computer that is connected to the printer, a printing system, and a control method for the printing system.

A printer according to a first preferred aspect of the invention is communicably connected over a network to a host computer and operates according to a command or data sent from the host computer, and includes a reception unit for receiving the command or data sent from the host computer; a timer for counting the time passed after the command or data is received; and an error detection unit for reporting that the host computer is in an error state when the command or data from the host computer is not received within a predetermined time after the timer starts counting the elapsed time.

Preferably, the error detection unit resets the elapsed time count of the timer and restarts counting the elapsed time when the command or data from the host computer is received within the predetermined time.

Further preferably, the printer also has a printing control unit for printing to a print medium. In this preferred aspect of the invention the error detection unit causes the printing control unit to print a message reporting the host computer error.

Yet further preferably, the printer also has a display unit for displaying the printer status. In this aspect of the invention the error detection unit causes the display unit to present a display reporting the host computer error.

Yet further preferably, the printer also has a sound source for reporting the printer status by sound. In this aspect of the invention the error detection unit causes the sound source to emit a sound reporting the host computer error.

Yet further preferably, the printer also has a non-volatile storage unit for storing the predetermined time, and the predetermined time is set based on a configuration command sent from the host computer.

Another preferred aspect of the invention is a host computer for sending a command or data to a printer that is communicably connected over a network. The host computer has a printer control command generating unit for regularly sending a reset/start command to the printer at an interval that is shorter than the predetermined time set in the printer, and the printer reports that the host computer is in an error state when the command or data from the host computer is not received within the predetermined time after the command or data including the reset/start command is received.

Another preferred aspect of the invention is a printing system including a host computer and a printer that is communicably connected over a network to the host computer and operates according to a command or data sent from the host computer. A predetermined time for confirming host computer operation is stored in the printer. The host computer has a printer control command generating unit for regularly sending a reset/start command to the printer at an interval that is shorter than the predetermined time. The printer has an error detection unit for reporting that the host computer is in an error state when the command or data including the reset/start command from the host computer is not received within the predetermined time after the printer receives the command or data including the reset/start command.

In this printing system the printer preferably resets the elapsed time count and restarts counting the elapsed time when the command or data from the host computer is received within the predetermined time.

Further preferably, the printer has a printing control unit for printing to a print medium, and the error detection unit causes the printing control unit to print a message reporting the host computer error when the command or data including the reset/start command from the host computer is not received within the predetermined time.

Yet further preferably, the printer also has a display unit for displaying the printer status, and the error detection unit causes the display unit to present a display reporting the host computer error when the command or data including the reset/start command from the host computer is not received within the predetermined time.

Yet further preferably, the printer also has a sound source for reporting the printer status by sound, and the error detection unit causes the sound source to emit a sound reporting the host computer error when the command or data including the reset/start command from the host computer is not received within the predetermined time.

Yet further preferably, the printer also has a non-volatile storage unit for storing the predetermined time, and the predetermined time is set based on a configuration command sent from the host computer.

Another preferred aspect of the invention is a control method for a printing system including a host computer and a printer that is communicably connected over a network to the host computer, operates according to a command or data sent from the host computer, and has a predetermined time for confirming host computer operation set in the printer. The control method has steps of: sending a reset/start command from the host computer to the printer regularly at an interval that is shorter than the predetermined time; and issuing a report from the printer that the host computer is in an error state when the printer does not receive the command or data including the reset/start command from the host computer within the predetermined time after the printer receives the command or data including the reset/start command.

A printer according to a preferred embodiment of the invention is configured to report that the host computer is in an error state when a command or data from the host computer is not received within a predetermined time. As a result, the printer user can know immediately from this error report when there is a problem with the host computer even if the host computer is in a remote location.

This predetermined time is counted by a timer, and the timer is reset if the command or data from the host computer is received within the predetermined time. The printer therefore continues to determine in a repeating loop for as long as the command or data is sent from the host computer whether the command or data from the host computer was received, and the error detection unit can report immediately when the command or data is not received.

The error detection unit is configured to report host computer errors by printing a message denoting the problem, driving a display unit to denote the problem, or outputting a sound denoting the problem. These different reporting means can also be used in combination. The printer user can thus be informed both visually and audibly when there is a problem with the host computer, and can thus reliably know when there is a host computer problem.

The predetermined time is also preferably set based on a configuration command sent from the host computer. This configuration command from the host computer can therefore be used to change the predetermined time according to the system operating environment after the predetermined time has been set, and can also be used to disable the error detection function.

The host computer according to at least one embodiment of the invention is configured to send a reset/start command to the printer regularly at an interval that is shorter than the predetermined time that is set in and used by the printer for the printer to confirm host computer operation. If the printer receives the command or data including the reset/start command and then does not receive another command or data from the host computer within the predetermined time, the printer reports that a host computer error has occurred. Because the host computer is configured to regularly send a command or data at least once during an interval that is shorter than the predetermined time kept by the printer for verifying communication with the host computer, the host computer can continuously inform the printer that operation is normal. If something then happens on the host computer side so that the command or data cannot be sent to the printer, the printer will not receive the command or data and will immediately know that there is a problem with the host computer, and can inform the user accordingly.

The host computer of the invention is any computer that can communicate with and control the printer, and can therefore be a server that controls a plurality of computers and printers, or a general purpose terminal device or computer (personal computer) that controls a printer in a 1-to-1 connection.

Other objects and attainments together with a fuller understanding of the invention will become apparent and appreciated by referring to the following description and preferred embodiment taken in conjunction with the accompanying drawings.

DESCRIPTION OF EMBODIMENTS

A preferred embodiment of a printer, a host computer, and a printing system including the printer and the host computer according to the present invention are described below with reference to the accompanying figures. The printer according to this preferred aspect of the invention is communicably connected to the host computer over a network, and prints according to print data and control commands sent from the host computer.

The printer 240 according to this embodiment of the invention is described next.

Figure 1:
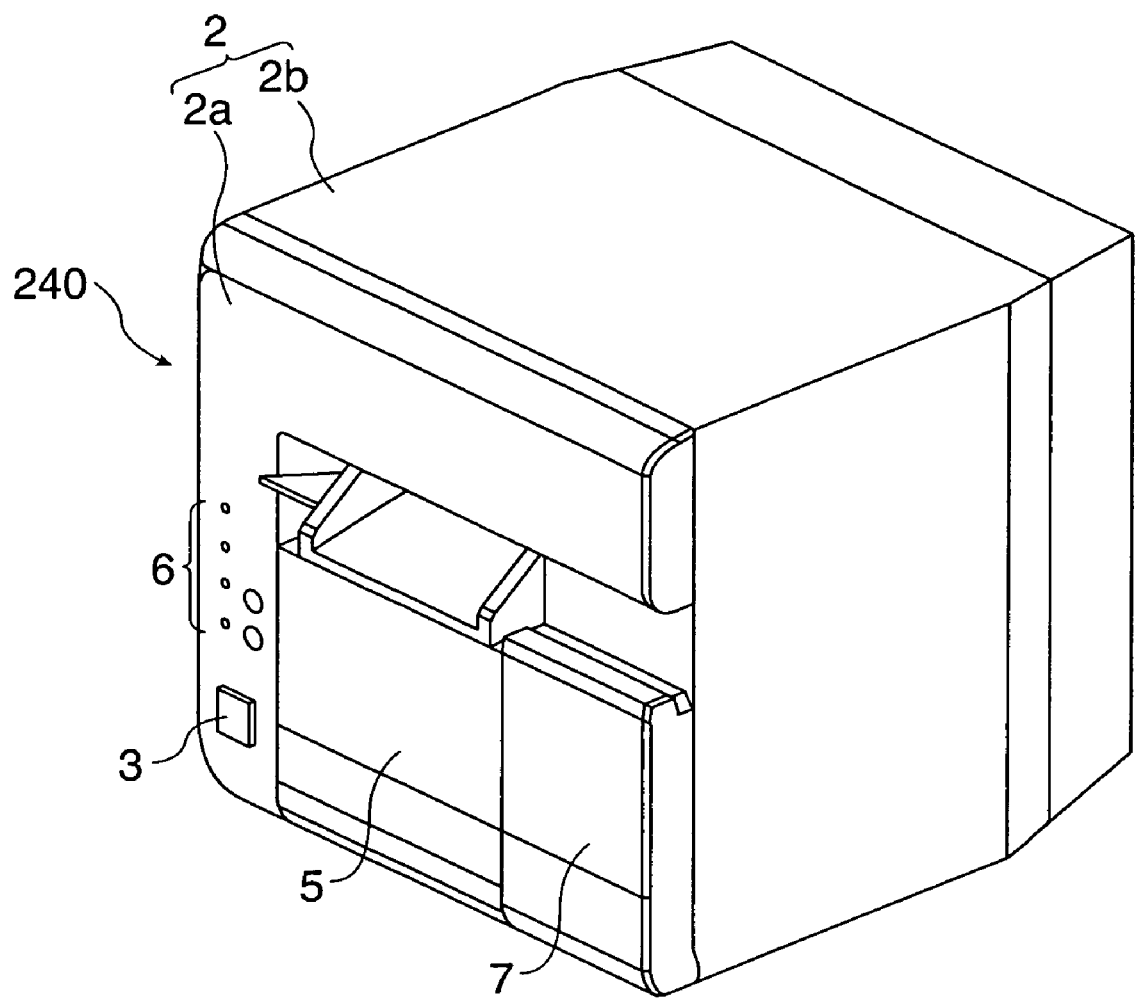
FIG. 1 is an oblique view of a printer according to a preferred embodiment of the invention.
Figure 2:
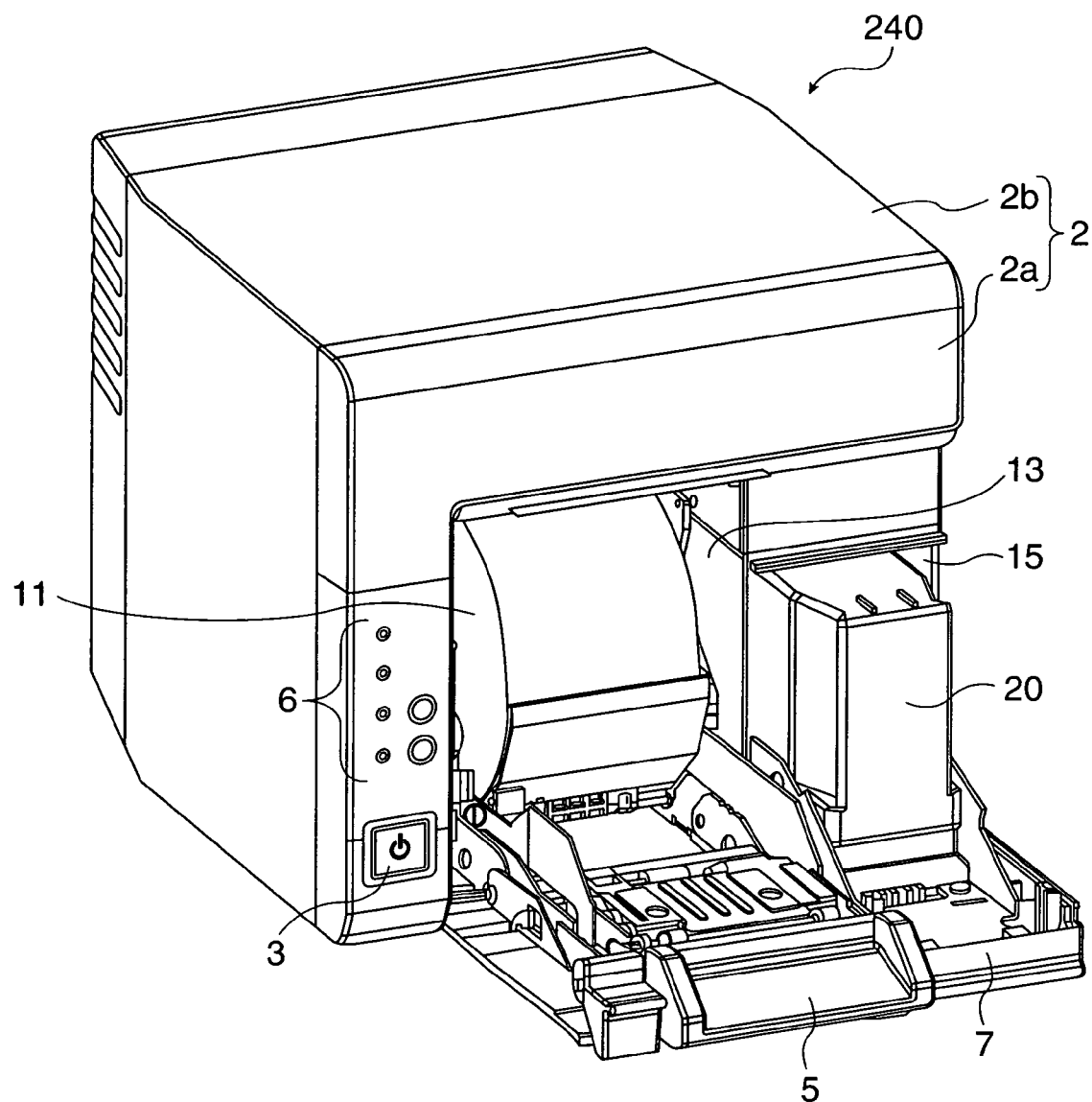
FIG. 2 is an oblique view of the printer shown in FIG. 1 with the two front covers opened to access the inside of the printer.

The printer 240 according to this embodiment of the invention is a color printer for printing coupons by using plural colors of ink to print images on roll paper that is used as the recording medium as shown in FIG. 1 and FIG. 2.

As shown in FIG. 1, the printer 240 has a printer case 2 including a front top panel 2a and a case cover 2b. A power switch 3, a roll paper cover 5, and an ink cartridge compartment cover 7 are disposed from left to right at the front of the printer case 2. A display unit 6 (hereinafter referred to as "LED indicators") for reporting the status of the printer 240 and host computer 220 to the user is provided above the power switch 3. The roll paper cover 5 and ink cartridge compartment cover 7 each pivot to the front to open and close on hinges (not shown) positioned at the bottom part of the covers.

Opening the roll paper cover 5 provides access to the roll paper compartment 13 where the roll paper 11 used for printing is held, as shown in FIG. 2. This enables replacing the roll paper 11.

Opening the ink cartridge compartment cover 7 provides access to the ink cartridge compartment 15 so that an ink cartridge 20 can be installed in or removed from the ink cartridge compartment 15.

The ink cartridge 20 is a package containing three color ink packs for yellow, cyan, and magenta contained in a cartridge case. Opening and closing the ink cartridge compartment cover 7 in this printer 240 causes the ink cartridge 20 in the ink cartridge compartment 15 to slide between the cartridge replacement position and the cartridge usage position where the cartridge is ready to be used.

The relationship between the host computer 220 and the printer 240 that render a printing system according to the present invention is described next with reference to FIG. 3 and FIG. 4.

Figure 3:
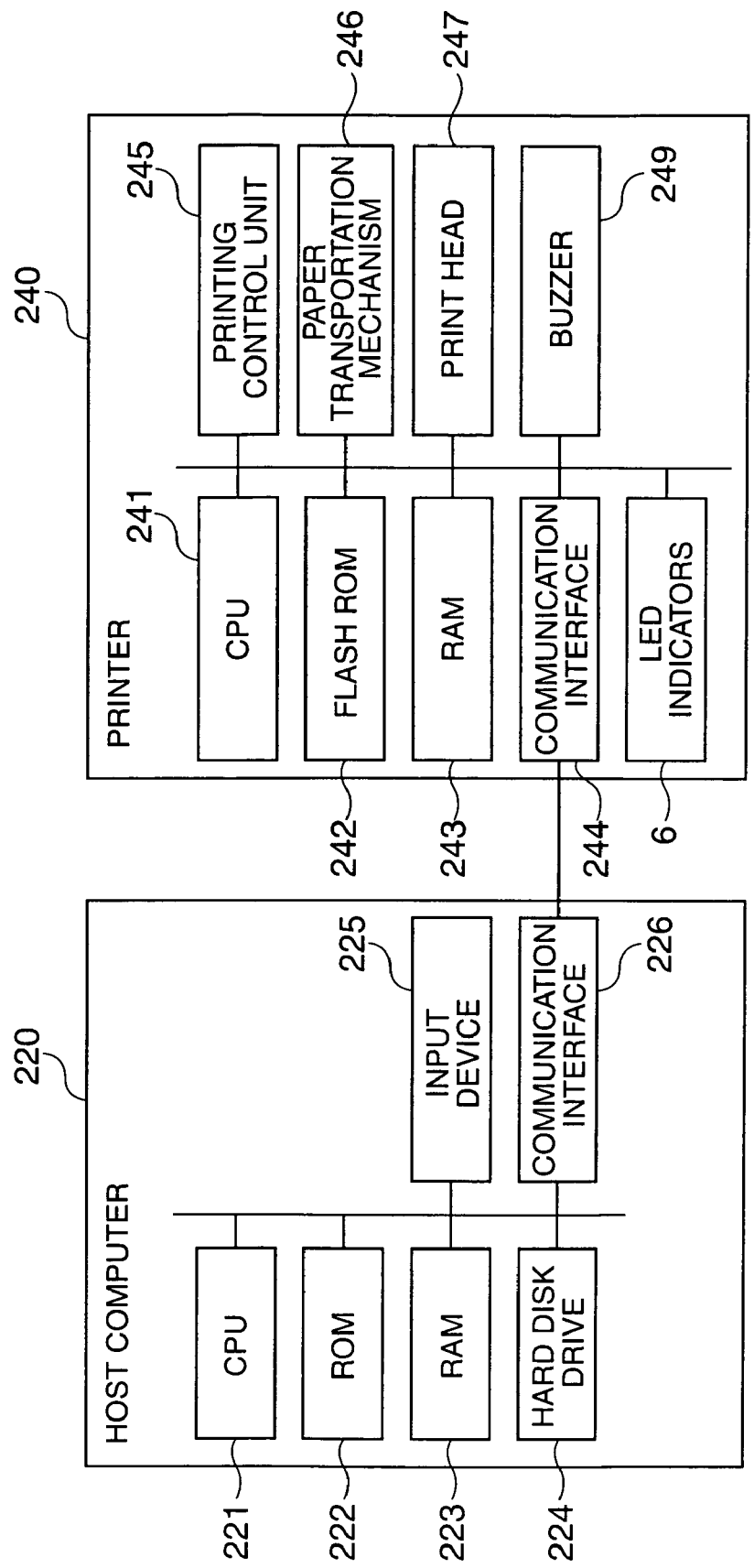
FIG. 3 is a block diagram showing the electrical arrangement of the host computer and printer in a preferred embodiment of the invention.

FIG. 3 is a block diagram showing the electrical arrangement of the host computer 220 and printer 240.

As shown in FIG. 3 the host computer 220 includes a CPU 221, ROM 222 as non-volatile memory, RAM 223 as volatile memory, a hard disk drive 224 as a large capacity storage device, an input device 225, and a communication interface 226. The host computer 220 controls the printer 240 by outputting commands and print data through the communication interface 226 to the printer 240 as a result of the CPU 221 running an operating system and application program stored on the hard disk drive 224.

The printer 240 includes a CPU 241, flash ROM 242 as rewritable non-volatile memory, RAM 243 as volatile memory, a communication interface 244, a printing control unit 245 for discharging ink to record images on the roll paper 11, a paper transportation mechanism 246, a print head 247, a buzzer 249, and the LED indicators 6.

The printer 240 receives print data by communicating with the host computer 220 through the communication interface 244 as a result of the CPU 241 executing firmware stored in the flash ROM 242. The printing control unit 245 prints a receipt or coupon, for example, based on the commands and print data by driving the print head 247 to print on the roll paper 11 while advancing the roll paper 11 by means of the paper transportation mechanism 246. The printer 240 also visually or audibly reports information to the user by causing the LED indicators 6 to light steadily or blink, or by causing the buzzer 249 to sound.

The printer 240 monitors the commands and data sent from the host computer 220, determines if the host computer 220 is operating normally, and executes a specific error detection reporting process if the printer 240 determines there is a problem with the host computer 220.

The method used by the printer 240 to determine if a host computer 220 error has occurred, and the error detection reporting process executed by the printer 240 when an error occurs, are described below.

Figure 4:
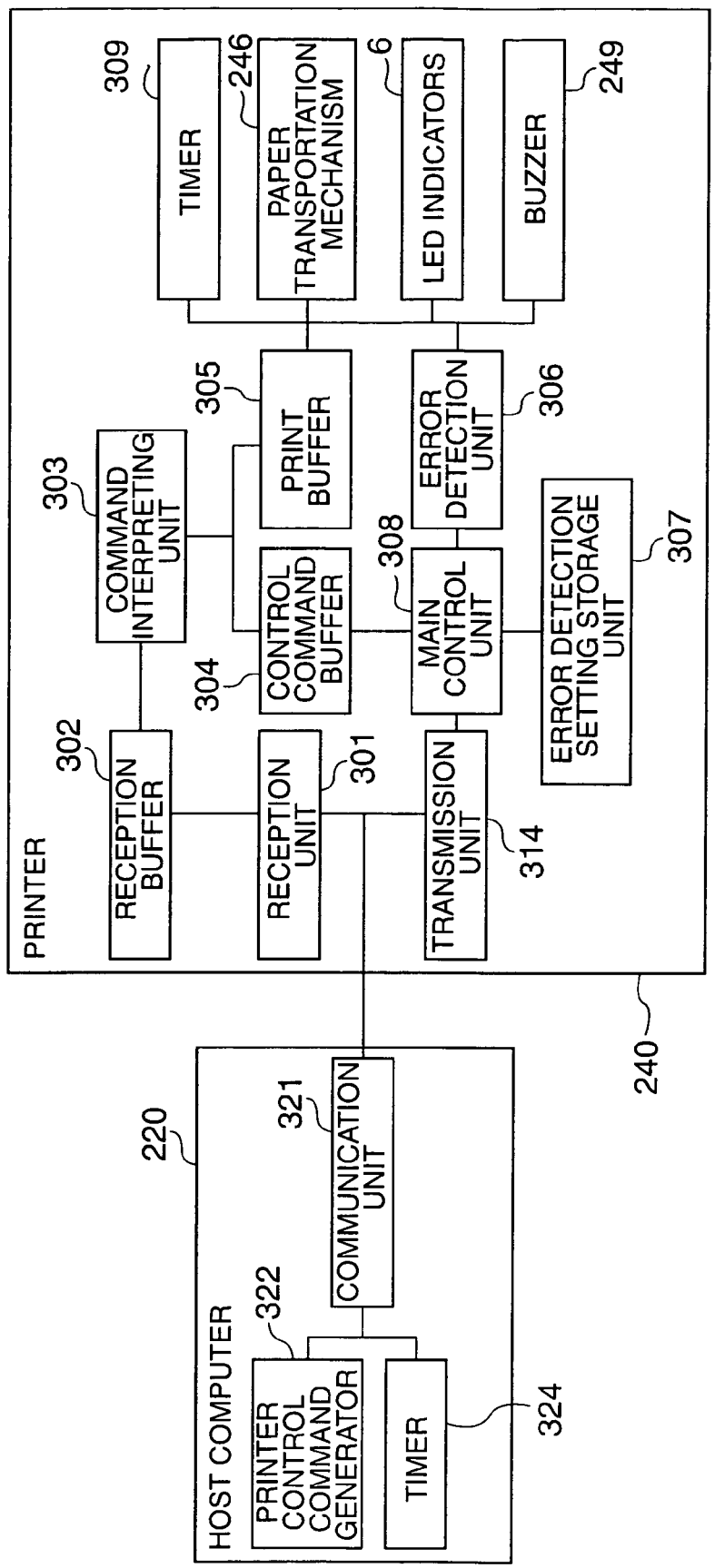
FIG. 4 is a function block diagram showing the internal processes of the host computer and printer.

FIG. 4 is a functional block diagram of the internal processing of the host computer 220 and printer 240.

The printer 240 is described first. As shown in FIG. 4 a reception unit 301 for receiving the commands and print data sent from the host computer 220, and a reception buffer 302 for temporarily storing the commands and print data received by the reception unit 301, are provided in the printer 240. Data stored in the reception buffer 302 is then interpreted by the command interpreting unit 303, and any control commands are stored in a control command buffer 304 and any print data is stored in the print buffer 305 by DMA transfer, for example.

The print data temporarily stored in the print buffer 305 is converted by a data conversion process to dot pattern data appropriate for the nozzles of the print head 247 and stored in the print buffer 305. The main control unit 308 reads the control command data temporarily stored in the control command buffer 304 and executes the process appropriate to the control command, such as a paper cut command or configuring error detection reporting.

The error detection unit 306 monitors if the host computer 220 is operating normally, and when an error is detected, controls a particular error reporting means to report a host computer error to the user. A specific error detection method is described more fully below.

The error detection setting storage unit 307 (non-volatile storage unit) is an area reserved in the flash ROM 242, and in this embodiment of the invention, stores error detection settings used in the error detection process. These error detection settings include at least an error detection time (a predetermined time) that is used as a reference time for determining if there is a problem (error) with the host computer 220, and an error detection method setting that denotes the type of error detection method used to report the error when a host computer 220 error is detected.

The host computer 220 in this embodiment of the invention is described next.

The host computer 220 can execute various processes by running the operating system and application programs stored on the hard disk drive 224, for example. As shown in FIG. 4, the host computer 220 has a communication unit 321, a printer control command generator 322, and a timer 324.

The communication unit 321 is a driver for communicating with the printer 240, and sends commands and print data to the printer 240 and receives data from the printer 240 through a port such as a LAN port for communicating with the printer 240 according to commands from an application program or the OS, respectively.

When instructed by a command from an application program not shown, the printer control command generator 322 sends a configuration command or a reset/start command through the communication unit 321 to the printer 240 to cause the printer 240 to start checking whether a host computer 220 error has occurred. After sending the configuration command or reset/start command to the printer 240, the printer control command generator 322 starts keeping time by means of the timer 324, and regularly resends the reset/start command at a time that is shorter than the specific time that is set by the configuration command. This reset/start command tells the printer 240 that the host computer 220 is operating normally. In the error detection reporting process described below, the printer 240 uses this reset/start command to determine if a host computer 220 error has occurred.

The error detection reporting process of the printer 240 is described next.

If the command interpreting unit 303 of the printer 240 determines that the received command is a configuration command or a reset/start command, the error detection unit 306 uses the timer 309 to start counting the time passed since the command was received. The error detection unit 306 then monitors whether another reset/start command (or data) is received from the host computer 220 after the timer 309 starts counting, and determines that an error occurred in the host computer 220 error has occurred if a reset/start command is not received within the error detection time stored in the error detection setting storage unit 307. On the other hand, if a reset/start command is received within this error detection time, the error detection unit 306 resets the count of the timer 309 to zero and continues counting the elapsed time. The printer 240 determines that the host computer 220 is operating normally in this case.

As long as the host computer 220 continues to operate normally, the host computer 220 continues to regularly send a reset/start command at an interval shorter than the error detection time stored in the printer 240 as controlled by the printer control command generator 322. If the error detection time set in the printer 240 is 10 minutes, for example, the host computer 220 sends the reset/start command to the printer 240 at an interval shorter than 10 minutes, such as every 9 minutes.

Situations in which the printer 240 may cease to receive the reset/start command from the host computer 220 within the error detection time include situations in which there is a problem with the host computer 220 itself and when there is a problem with the connection between the printer 240 and host computer 220, which causes the commands sent from the host computer 220 not being received by the printer 240. In any such case, data from the host computer 220 cannot be received by the printer 240, and some corrective action is required. As a result, if the reset/start command is not received within the error detection time, the printer 240 reports an error to the user according to the error detection method setting stored in the error detection setting storage unit 307.

The error reporting means denoted by the error detection method setting may include any one of or a combination of actions such as printing an error message, driving the LED indicators 6 to report an error, and driving the buzzer 249 to output an error alarm. By using printing an error message, outputting an audible error alarm, and driving the LED indicators 6 in combination, the printer 240 user can be both visually and audibly informed of the host computer error status so that if the system crashes, the cause can be determined reliably and action to restore the system can be taken quickly.

The error detection time and error detection method setting stored in the printer 240 can be changed while the system is running as a result of the host computer 220 sending an appropriate configuration command. By thus enabling changing the error detection time and error detection method setting, the system administrator can configure the error detection reporting settings appropriately for how the system is used.

The error detection reporting process according to a preferred aspect of the invention is described next with reference to FIG. 5.

Figure 5:
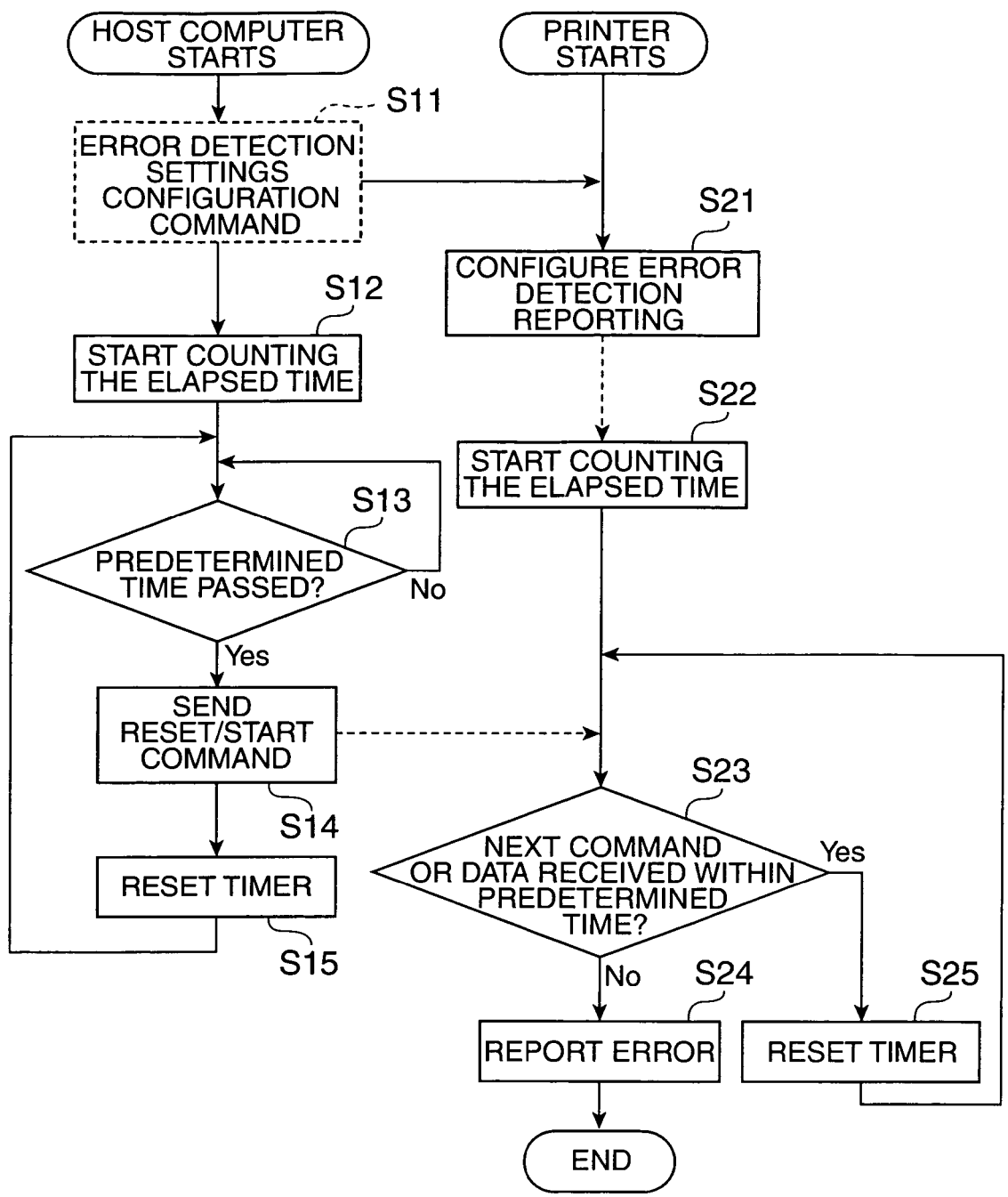
FIG. 5 is a flow chart describing the error detection reporting process of the error detection reporting system rendered by the host computer and printer.
Figure 6:
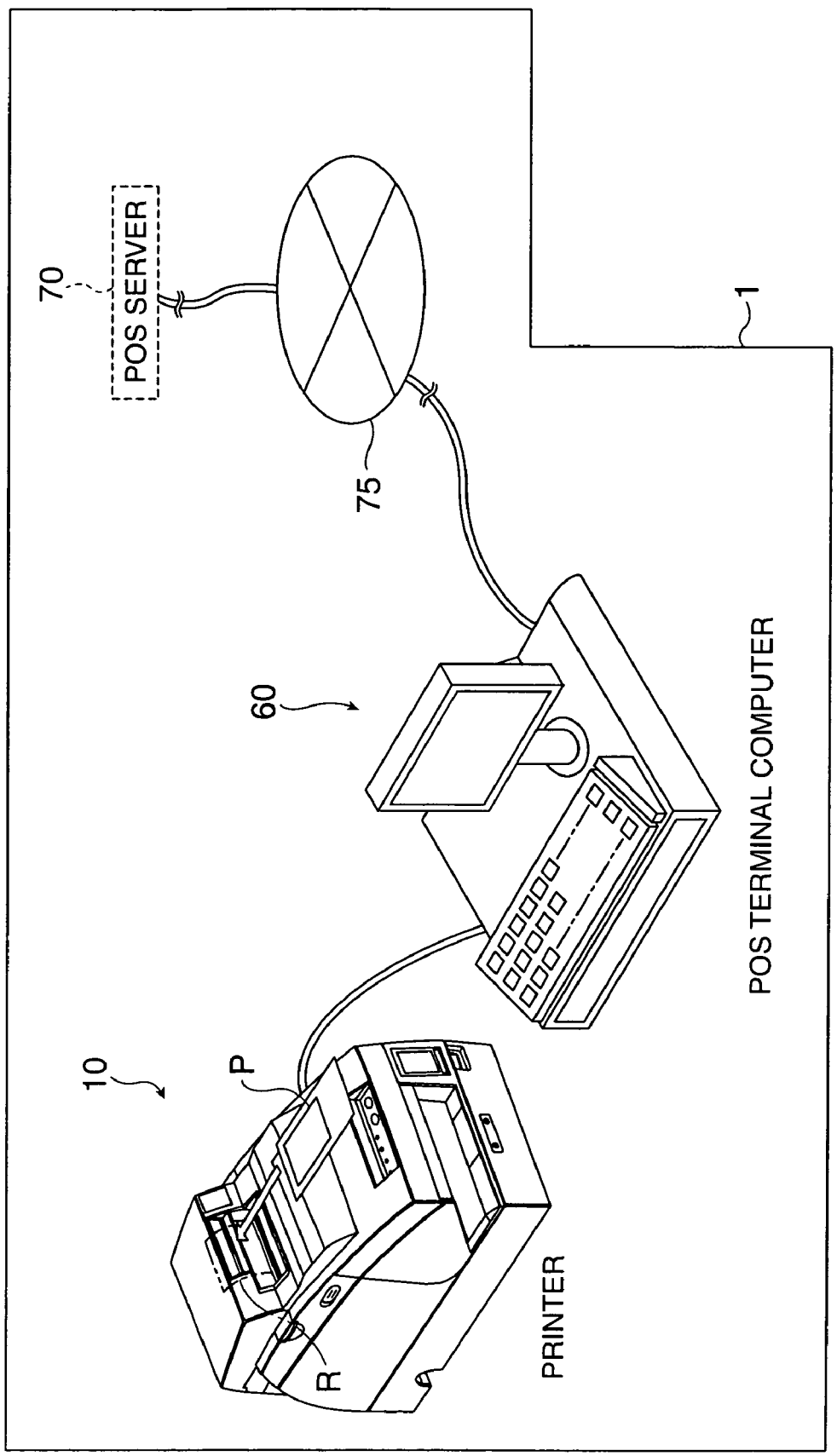
FIG. 6 is a schematic diagram of a conventional POS system.

FIG. 5 is a flow chart describing the error detection reporting process of the error detection reporting system (printing system) performed by the host computer 220 and printer 240.

The first time the error detection reporting system is used, the printer control command generator 322 of the host computer 220 sends an error detection settings configuration command through the communication unit 321 to the printer 240 (step S11). In this example, this configuration command sets printing an error message as the error reporting method executed by the printer 240 when the printer 240 does not receive a reset/start command from the host computer 220 within the ten minute checking period. When the host computer 220 sends the error detection settings configuration command in step S11, the timer 324 starts counting the time passed since the command is output (step S12). The error detection settings configuration command is sent only once the first time the error detection reporting system is first used in this embodiment of the invention, but the configuration command can be sent every time power to the host computer 220 is turned on and whenever the error detection settings are changed while the system is operating.

If the command interpreting unit 303 of the printer 240 determines that the received command is an error detection settings configuration command, the main control unit 308 sets the error detection time stored in the error detection setting storage unit 307 (e.g., to 10 minutes) and sets the error reporting method executed by the error detection unit 306 when a host computer 220 error is detected to e.g., "print an error message." The error detection reporting setting of the printer 240 is thus configured (step S21) and error detection reporting firmware handles error reporting when a host computer 220 error occurs.

When the error detection settings are stored in a nonvolatile area in the flash ROM 242, error detection reporting can be reset every time the printer 240 power is turned on. The error detection unit 306 restarts counting the elapsed time whenever an error detection settings configuration, a reset/start command, or print data is received from the host computer 220 as described below (step S22).

The printer control command generator 322 of the host computer 220 determines if a shorter time (e.g., 9 minutes) than the error detection time (e.g., 10 minutes) has passed. If the shorter time has passed (step S13 returns Yes), the printer control command generator 322 sends a reset/start command to the printer 240 (step S14). When the timer 324 is reset after the reset/start command is sent (step S15), counting the elapsed time starts and the reset/start command is thereafter resent every 9 minutes. This process thereafter repeats so that a reset/start command is regularly sent to the printer 240 as long as a host computer 220 error does not occur.

The error detection unit 306 of the printer 240 determines if a reset/start command is received from the host computer 220 within 10 minutes after timekeeping starts in step S22. If a reset/start command was received (step S23 returns Yes), the timer 309 is reset (step S25). Counting the elapsed time is then restarted after the reset/start command is received, and whether a reset/start command is received within the next ten minutes from the host computer 220 is thereafter determined (step S23). This process thereafter repeats and the printer 240 regularly receives the reset/start command as long as a host computer 220 error does not occur. The timing at which the elapsed time is reset is when the reset/start command is received in this example, but the timer could be reset whenever any particular command or data is received.

If in step S23 it is determined that a reset/start command was not received from the host computer 220 within the allotted time (e.g., 10 minutes) (step S23 returns No), the error detection unit 306 instructs the printing control unit 245 to issue an error detection report (e.g., print an error message) telling the user that there is a communication error with the host computer 220 by driving the print head 247 to print to the roll paper 11 while advancing the roll paper 11 by means of the paper transportation mechanism 246 (step S24).

After sending an error detection settings configuration command or reset/start command in this embodiment of the invention, the host computer 220 regularly sends the reset/start command at an interval (e.g., 9 minutes) that is shorter than the error detection time (e.g., 10 minutes) set by the error detection settings configuration command for issuing error detection reports. The printer 240 can thus know that the host computer 220 is operating normally as long as the reset/start command is received from the host computer 220 at the regular interval (e.g., 9 minutes). If the reset/start command has not been received even though more than the regular interval has passed, the printer 240 also knows that the reset/start command that is normally sent from the host computer 220 could not be sent within the regular interval for some reason. If the host computer 220 has crashed or hung, or if there is a problem with the connection between the host computer 220 and printer 240, the user can immediately know there is a problem with the host computer 220 as a result of the error detection report from the printer 240.

As a result, even if the host computer 220 is located remotely, the printer 240 user can immediately recognize there is a problem with the host computer 220 by simply reading the error message printed on the roll paper 11 discharged from the printer 240, reading a message on the display unit, or hearing a sound output by the printer 240, and can quickly take action to restore the system.

According to the invention, the timer for counting the error detection time in the printer can be reset when the reset/start signal, any command, or print data is received.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer that is communicably connected over a network to a host computer and operates according to commands and data sent from the host computer, comprising:
   a reception unit for receiving the commands and data sent from the host computer;
   a timer for counting an elapsed time, the elapsed time being reset at least every time the reception unit receives a predetermined command; and
   an error detection unit for reporting that the host computer is in an error state when the elapsed time counted by the timer is equal to or greater than a predetermined time;
   wherein the predetermined time is set based on a configuration command sent from the host computer.

2. The printer described in claim 1, wherein the predetermined command is a reset/start command.

3. The printer described in claim 1, further comprising:
   a printing control unit for printing to a print medium;
   wherein the error detection unit causes the printing control unit to print a message reporting the host computer error state.

4. The printer described in claim 1, further comprising:
   a display unit for displaying a status of the printer;
   wherein the error detection unit causes the display unit to present a display reporting the host computer error state.

5. The printer described in claim 1, further comprising:
   a sound source for reporting a status of the printer by sound;
   wherein the error detection unit causes the sound source to emit a sound reporting the host computer error state.

6. The printer described in claim 1, further comprising:
   a non-volatile storage unit for storing the predetermined time.

7. A host computer for sending commands and data to a printer that is communicably connected to the host computer over a network, comprising:
   a printer control command generating unit for regularly sending a reset/start command to the printer at an interval that is shorter than a predetermined time set in the printer;
   wherein the host computer enters an error state when a reset/start command from the host computer is not received within the predetermined time after a previous reset/start command is received; and
   wherein the host computer sets the predetermined time by sending a configuration command to the printer.

8. A printing system including a host computer and a printer that is communicably connected over a network to the host computer and operates according to a commands and data sent from the host computer, wherein:
   a predetermined time for confirming host computer operation is set in the printer based on a configuration command sent from the host computer;
   the host computer comprises a printer control command generating unit for regularly sending a reset/start command to the printer at an interval that is shorter than the predetermined time; and
   the printer comprises an error detection unit for reporting that the host computer is in an error state when a reset/start command from the host computer is not received within the predetermined time after the printer receives a previous reset/start command.

9. The printing system described in claim 8, wherein the printer resets an elapsed time count and restarts counting the elapsed time count when a reset/start command from the host computer is received within the predetermined time.

10. The printing system described in claim 8, wherein:
    the printer comprises a printing control unit for printing to a print medium; and
    the error detection unit causes the printing control unit to print a message reporting the host computer error when a reset/start command from the host computer is not received within the predetermined time.

11. The printing system described in claim 8, wherein:
    the printer comprises a display unit for displaying a status of the printer; and
    the error detection unit causes the display unit to present a display reporting the host computer error when a reset/start command from the host computer is not received within the predetermined time.

12. The printing system described in claim 8, wherein:
    the printer comprises a sound source for reporting a status of the printer by sound; and
    the error detection unit causes the sound source to emit a sound reporting the host computer error when a reset/start command from the host computer is not received within the predetermined time.

13. The printing system described in claim 8, wherein:
    the printer comprises a non-volatile storage unit for storing the predetermined time.

14. A control method for a printing system including a host computer and a printer that is communicably connected over a network to the host computer, the printer operating according to commands and data sent from the host computer and having a predetermined time for confirming host computer operation set therein, the control method comprising:
sending a configuration command from the host computer to the printer to set the predetermined time;
sending a reset/start command from the host computer to the printer regularly at an interval that is shorter than the predetermined time; and
issuing a report from the printer that the host computer is in an error state when the printer does not receive a reset/start command from the host computer within the predetermined time after the printer receives a previous reset/start command.

15. The printing system described in claim 8, wherein:
the configuration command includes a command to change an error detection method setting of the printer.

16. The printing system described in claim 15, wherein the configuration command is changed when the host computer is powered on and when error detection settings are changed while the system is operating.

17. The printing system described in claim 15, wherein the configuration command is changed when error detection settings are changed.

* * * * *